(12) United States Patent
Seo et al.

(10) Patent No.: US 10,712,992 B2
(45) Date of Patent: Jul. 14, 2020

(54) MODULAR DISPLAY APPARATUS AND METHOD FOR CONTROLLING THEREOF

(71) Applicant: SAMSUNG ELECTRONICS CO., LTD., Suwon-si (KR)

(72) Inventors: Jeongryeol Seo, Suwon-si (KR); Sangwon Kim, Suwon-si (KR); Youngkook Kim, Suwon-si (KR); Hyewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/399,344

(22) Filed: Apr. 30, 2019

(65) Prior Publication Data

US 2019/0384560 A1 Dec. 19, 2019

(30) Foreign Application Priority Data

Jun. 14, 2018 (KR) ........................ 10-2018-0068071

(51) Int. Cl.
*G06F 3/14* (2006.01)
*H05K 5/00* (2006.01)
*G09F 9/302* (2006.01)

(52) U.S. Cl.
CPC .......... *G06F 3/1446* (2013.01); *G09F 9/3026* (2013.01); *H05K 5/0017* (2013.01)

(58) Field of Classification Search
CPC .... G06F 3/1446; G09F 9/3026; H05K 5/0017
USPC ........................................................ 345/1.3
See application file for complete search history.

(56) References Cited

U.S. PATENT DOCUMENTS

| 6,285,343 B1 | 9/2001 | Brody |
| 6,501,441 B1 | 12/2002 | Ludtke et al. |
| 9,354,840 B2 | 5/2016 | Seo et al. |
| 9,854,613 B2 | 12/2017 | Son |
| 2005/0134526 A1 | 6/2005 | Willem et al. |
| 2014/0078685 A1 | 3/2014 | Lee et al. |

(Continued)

FOREIGN PATENT DOCUMENTS

| JP | 2007-193135 A | 8/2007 |
| KR | 10-0172330 B1 | 3/1999 |

(Continued)

OTHER PUBLICATIONS

International Search Report (PCT/ISA/210) dated Aug. 21, 2019 issued by the International Searching Authority in International Application No. PCT/KR2019/005736.

(Continued)

*Primary Examiner* — Mark Edwards
(74) *Attorney, Agent, or Firm* — Sughrue Mion, PLLC

(57) ABSTRACT

A modular display apparatus is provided. The modular display apparatus includes a plurality of display modules, a plurality of connectors, and a processor configured to divide the plurality of display modules into a plurality of groups based on a vertical direction, and based on an order of connection of at least one display module included in each of the plurality of groups, identify the location of each of the at least one display module included in each of the plurality of groups, and based on the identified locations of the display modules, display images, on each of the plurality of the display modules, corresponding to image signals received from an external apparatus.

16 Claims, 10 Drawing Sheets

(56) References Cited

U.S. PATENT DOCUMENTS

2014/0111530 A1    4/2014  Choi et al.
2018/0130325 A1    5/2018  Kiani et al.
2019/0265939 A1*   8/2019  Foster .................. G06F 3/1446

FOREIGN PATENT DOCUMENTS

| KR | 10-2005-0065355 A | 6/2005 |
| KR | 10-2013-0093853 A | 8/2013 |
| KR | 10-2013-0124101 A | 11/2013 |
| KR | 10-2016-0122028 A | 10/2016 |
| KR | 10-2017-0114350 A | 10/2017 |
| WO | 2015-178698 A1 | 11/2015 |

OTHER PUBLICATIONS

Written Opinion (PCT/ISA/237) dated Aug. 21, 2019 issued by the International Searching Authority in International Application No. PCT/KR2019/005736.

* cited by examiner

100

MODULAR DISPLAY APPARATUS AND METHOD FOR CONTROLLING THEREOF

CROSS-REFERENCE TO RELATED APPLICATION(S)

This application is based on and claims priority under 35 U.S.C. § 119 to Korean Patent Application No. 10-2018-0068071, filed on Jun. 14, 2018, in the Korean Intellectual Property Office, the disclosure of which is incorporated by reference herein in its entirety.

BACKGROUND

1. Field

The disclosure relates to a modular display apparatus and a controlling method thereof. Particularly, the disclosure relates to a modular display apparatus of which screen can be extended, and a controlling method thereof.

2. Description of Related Art

As electronic technologies develop more rapidly, various types of electronic apparatuses that suit the needs of consumers are being developed. In particular, large-size display apparatuses to which a plurality of display modules are connected are being developed recently.

In the case of a large-size display apparatus, there is a need to extend the size of its screen depending on situations. For example, in a large conference room or a large auditorium, there is a need to extend the size of the screen to enable a plurality of users to view a content displayed on the large-size display apparatus.

However, in the case of large-size display apparatuses in the related art, there was a problem that their screens could not be extended once the products have been manufactured. Thus, the large-size display did not provide much flexibility and convenience in terms of extending the screens.

Also, even when the screens of the apparatuses could be extended, there was inconvenience that the identification numbers of newly connected display modules had to be set manually.

SUMMARY

In accordance with an aspect of the disclosure, there is provided modular display apparatus including: a plurality of display modules; a plurality of connectors; and a processor configured to: divide the plurality of display modules into a plurality of groups based on a vertical direction, based on an order of connection of at least one display module included in each of the plurality of groups, identify a location of each of the at least one display module included in each of the plurality of groups, based on the identified locations of the display modules, display, on each of the plurality of the display modules, images corresponding to image signals received from an external apparatus, wherein each of the plurality of connectors is provided on one of the at least one display module included in each of the plurality of groups, and is connected to a respective port of a plurality of ports provided on the external apparatus, and wherein the processor is further configured to receive image signals corresponding to each of the plurality of groups from the external apparatus through each of the plurality of connectors, and based on information regarding the plurality of ports of the external apparatus included in the received image signals, identify the plurality of ports of the external apparatus respectively connected to the plurality of connectors, and divide the plurality of display modules into the plurality of groups based on the vertical direction according to the identified plurality of ports.

Each of the plurality of connectors may be provided on an outermost display module among display module belonging to each of the plurality of groups.

The information regarding the plurality of ports of the external apparatus may be included in blank areas of the image signals.

Display modules included in each of the plurality of groups may be serially connected in the vertical direction.

Each display module of the plurality of display modules may include at least one sensor configured to detect another display module disposed on a side of the display module, and the processor may be further configured to turn on the sensors of the plurality of display modules, and identify a first group including at least one display module which does not detect another display module.

The processor may be further configured to turn off sensors of display modules included in the first group, and turn on sensors of display modules included in remaining groups excluding the first group, and after the sensors of the display modules included in the first group are turned off, identify a second group including display modules which do not detect another display module.

The processor may be further configured to transmit a signal requesting transmission of an image corresponding to the first group to a port of the external apparatus that is connected to a connector of the first group.

The processor may be further configured to, based on at least one new display module being connected to one of the plurality of groups in a horizontal direction, identify a group of the least one new display module based on information regarding the plurality of ports of the external apparatus, and based on an order of connection of display modules included in the identified group, identify locations of the display modules included in the identified group.

The processor may be further configured to, based on at least one new display module being connected to one of the plurality of groups in the vertical direction, identify locations of the at least one new display module based on an order of connection of display modules included in the identified group and locations of connection of the at least one new display module.

In accordance with an aspect of the disclosure, there is provided a method for controlling a modular display apparatus, the method including: dividing a plurality of display modules into a plurality of groups based on a vertical direction; based on an order of connection of at least one display module included in each of the plurality of groups, identifying a location of each of the at least one display module included in each of the plurality of groups; and based on the identified locations of the display modules, displaying images corresponding to image signals received from an external apparatus on each of the plurality of display modules, wherein a connector of a plurality of connectors of the modular display apparatus is provided on one of the at least one display module included in each of the plurality of groups, and is connected to a port of a plurality of ports provided on the external apparatus, and wherein the dividing the plurality of display modules into the plurality of groups includes receiving image signals corresponding to each of the plurality of groups from the external apparatus through each of the plurality of connectors, and based on information regarding the plurality of ports of the external apparatus included in the received image signals, identifying the plurality of ports of the external apparatus connected to the plurality of the connectors, and dividing the plurality of display modules into the plurality of groups based on the vertical direction according to the identified plurality of ports.

Each of the plurality of connectors may be provided on an outermost display module among display modules belonging to each of the plurality of groups.

The information regarding the plurality of ports of the external apparatus may be included in blank areas of the image signals.

Display modules included in each of the plurality of groups may be serially connected in the vertical direction.

Each display module of the plurality of display modules may include at least one sensor configured to detect another display module disposed on a side of the display module, and the dividing the plurality of display modules into the plurality of groups may further include turning on the sensors of the plurality of display modules, and identifying a first group including at least one display module wherein which does not detect another display module.

The dividing the plurality of display modules into the plurality of groups may further include turning off sensors of display modules included in the first group, and turning on sensors of display modules included in remaining groups excluding the first group; and after the sensors of the display modules included in the first group are turned off, identifying a second group including display modules which do not detect another display module.

The method may further include transmitting a signal requesting transmission of an image corresponding to the first group to a port of the external apparatus that is connected to a connector of the first group.

The method may further include based on at least one new display module being connected to one of the plurality of groups in a horizontal direction, identifying a group of the at least one new display module based on information regarding the plurality of ports of the external apparatus; and based on an order of connection of display modules included in the identified group, identifying locations of the display modules included in the identified group.

The method may further include based on at least one new display module being connected to one of the plurality of groups in the vertical direction, identifying locations of the at least one new display module based on an order of connection of display modules included in the identified group and locations of connection of the at least one new display module.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

First, as terms used in this specification and the claims, general terms were selected, in consideration of the functions described in the disclosure. However, the terms may vary depending on the intention of those skilled in the art, legal or technical interpretation or emergence of new technologies. Also, there are some terms that were arbitrarily designated by the applicant, and the meaning of such terms may be interpreted as defined in this specification. Terms that are not specifically defined in the disclosure may be interpreted based on the overall content of the disclosure and common technical knowledge in the pertinent art.

Herein, detailed explanation of related known functions or configurations that may unnecessarily confuse the gist of the disclosure may be abridged or omitted.

Further, while the embodiments of the disclosure will be described in detail with reference to the accompanying drawings and the contents described in the accompanying drawings, it should be noted that the embodiments are not for restricting or limiting the scope of the disclosure to a specific embodiment.

Hereinafter, the disclosure will be described in detail with reference to the accompanying drawings.

Figure 1A:
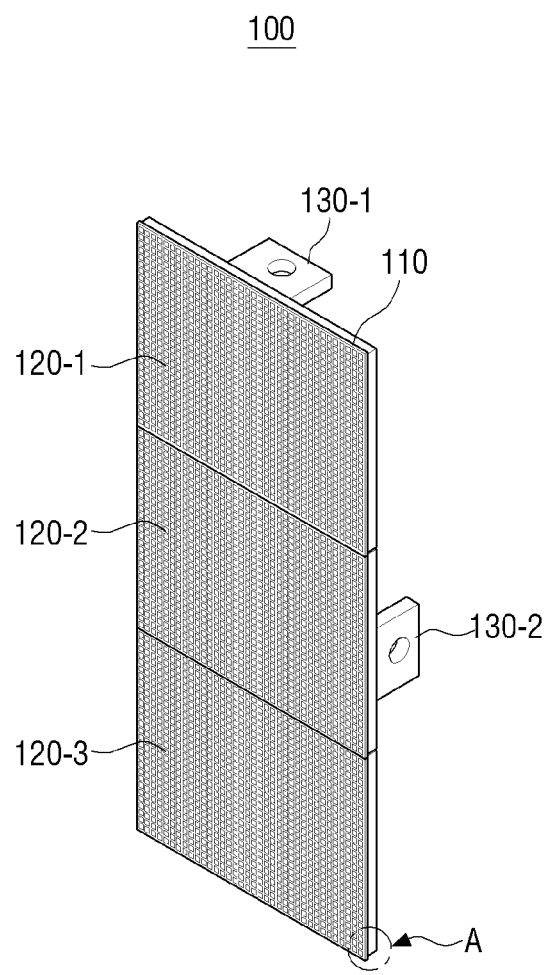
FIG. 1A is a diagram illustrating a display apparatus according to an embodiment.
Figure 1B:
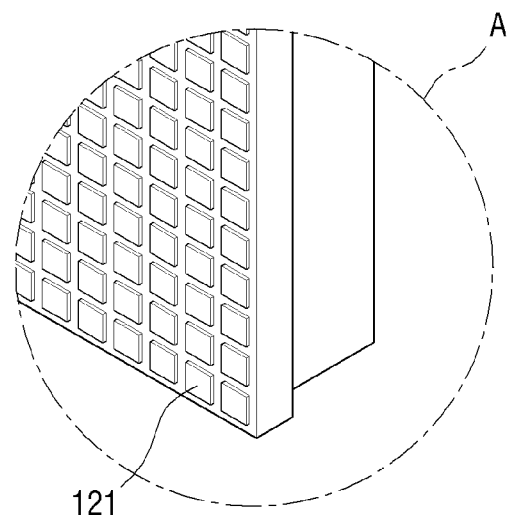
FIG. 1B is a diagram illustrating a part of a display apparatus according to an embodiment.
Figure 1C:
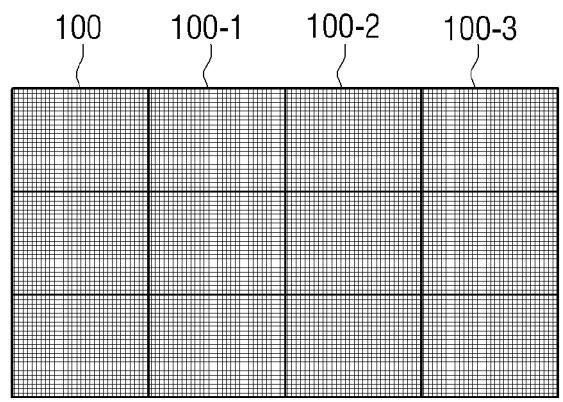
FIG. 1C is a diagram illustrating a large-size display apparatus according to an embodiment.

FIGS. 1A, 1B, and 1C are diagrams illustrating a display apparatus according to an embodiment.

Referring to FIG. 1A, a display apparatus 100 according to an embodiment may include a cabinet 110 and a plurality of display modules 120-1, 120-2, 120-3 that are disposed on the cabinet. That is, the display apparatus 100 may be implemented as a modular display apparatus to which the plurality of display modules 120-1, 120-2, 120-3 are physically connected.

Here, each of the plurality of display modules 120-1, 120-2, 120-3 may be implemented as an LED display module including light emitting diodes (LEDs).

Specifically, referring to FIG. 1B, each of the plurality of display modules 120-1, 120-2, 120-3 may be implemented as an LED display module including a plurality of LEDs 121, wherein a red LED, a green LED, and a blue LED are subpixels implemented as one pixel.

Here, the plurality of pixels may be arranged in the form of a matrix (e.g., M×N, where M and N are natural numbers). Specifically, the matrix may be in the form of an arrangement of identical numbers (e.g., M=N, where M and N are natural numbers, such as a 16×16 arrangement, a 24×24 arrangement, and the like). It may also be in the form of an arrangement of different numbers (e.g., M≠N, where M and N are natural numbers).

The LED of an LED display module according to an embodiment may be implemented as a micro LED. Here, a micro LED means an LED which is in a size of approximately 5~100 micrometers, and is a micro light emitting diode which emits light by itself without a color filter.

However, an LED display module as described above is just an example, and a display module may also be implemented as an organic LED (OLED), an active-matrix OLED (AMOLED), a plasma display panel (PDP), and the like. Hereinafter, for the convenience of explanation, a display module according to an embodiment will be explained based on the assumption that it is an LED display module.

Referring to FIG. 1A again, the display apparatus 100 according to an embodiment may be implemented in a form in which the plurality of display modules 120-1, 120-2, 120-3 are coupled in a 1×3 arrangement. That is, a plurality of display modules included in a cabinet 110 may be arranged in a vertical direction.

The LED display module in a 1×3 arrangement as described above is merely an example, and the form of arrangement and the number of display modules of the LED display module may be modified in various ways.

The cabinet 110 may include a base plate on which each of the plurality of display modules 120-1, 120-2, 120-3 can be mounted. Here, the base plate may be implemented in a form in which each of the display modules can be mounted on the front surface of the base plate. Accordingly, the display apparatus 100 according to an embodiment may be implemented in a bezel less form, and in displaying an image, the display apparatus 100 may display a seamless image without discontinuity among display modules.

The display apparatus 100 according to an embodiment may include a plurality of coupling parts 130-1, 130-2 that can be coupled with another display apparatus. Accordingly, the display apparatus 100 according to an embodiment may be implemented as a large-size display apparatus through coupling with another display apparatus.

For example, referring to FIG. 1C, the display apparatus 100 according to an embodiment may be implemented as a large-size display apparatus 100' such as a video wall, as it is coupled with a plurality of other display apparatuses 100-1, 100-2, 100-3 in a 4×1 arrangement. The large-size display apparatus in a 4×1 arrangement as described above is just an example. The form of arrangement and the number of display modules of a large-size display apparatus may be modified in various ways.

The display apparatus 100 may display various images by operating a plurality of LEDs.

Specifically, when image signals are received from an external apparatus, the display apparatus 100 may generate image signals corresponding to the location of each LED display module 120-1, 120-2, 120-3.

The display apparatus 100 may transmit image signals to each of the plurality of display modules 120-1, 120-2, 120-3 corresponding to the location of each display module.

Accordingly, each of the LED display modules may operate (e.g., turn on, turn off, or flicker) LEDs based on the received image signal. Thus, the display apparatus 100 may display various images through the LED display modules.

Hereinafter, the display apparatus 100 according to an embodiment will be described in more detail with reference to FIG. 2.

Figure 2:
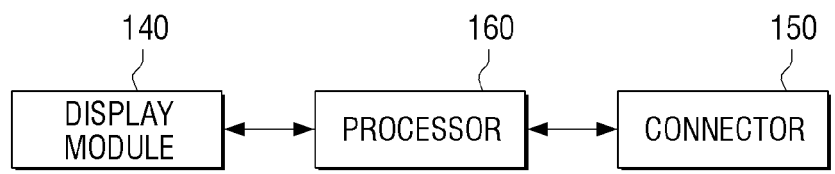
FIG. 2 is a block diagram illustrating a display apparatus according to an embodiment.

FIG. 2 is a block diagram illustrating a display apparatus according to an embodiment.

Referring to FIG. 2, the display apparatus 100 according to an embodiment includes a display module 140, a connector 150, and a processor 160. Hereinafter, the display apparatus 100 will be further explained with reference to FIGS. 3 and 4.

As described above, the display apparatus 100 may include a plurality of display modules 120-1, 120-2, 120-3. That is, the display apparatus 100 may be implemented as a modular display apparatus to which the plurality of display modules 120-1, 120-2, 120-3 are physically connected.

Also, as mentioned above with regard to FIG. 1C, the display apparatus 100 may be implemented as a large-size display apparatus 100', such as a video wall, in which a plurality of display apparatuses 100, 100-1, 100-2, 100-3 are coupled to each other.

Hereinafter, for convenience of explanation, the display apparatus 100 will be explained based on the assumption that it is a large-size display apparatus 100' in which a plurality of display apparatuses 100, 100-1, 100-2, 100-3 are coupled together.

The display module 140 may be implemented as an LED display module. Specifically, the display module 140 may be implemented as an LED display module including a plurality of LEDs in which a red LED, a green LED, and a blue LED are subpixels implemented as one pixel.

However, the LED display module as described above is just an example, and the display module may also be implemented as an OLED, an AMOLED, a PDP, and the like.

The connector 150 may be connected to an external apparatus. Here, an external apparatus is an apparatus that may transmit image signals to the display apparatus 100, and it may be a server, a set-top box, a personal computer (PC), a smartphone, and the like.

Further, an external apparatus may also be a repeater that receives an image signal from a set-top box and transmits the received image signal to the display apparatus 100.

Specifically, the connector 150 may be connected to a port of an external apparatus by a cable. Here, the cable may be a high definition multimedia interface (HDMI) cable.

However, this is just an example, and the cable may also be a digital visual interface (DVI) cable, a low voltage differential signals (LVDS) cable, an optical cable, or the like.

The large-size display apparatus 100' may also be connected to an external apparatus through wireless communication. As such, the large-size display apparatus 100' may include a WiFi chip, a Bluetooth chip, or a wireless communication chip, and the like.

The large-size display apparatus 100' according to an embodiment may also be connected to an external apparatus through a plurality of connectors.

Figure 3:
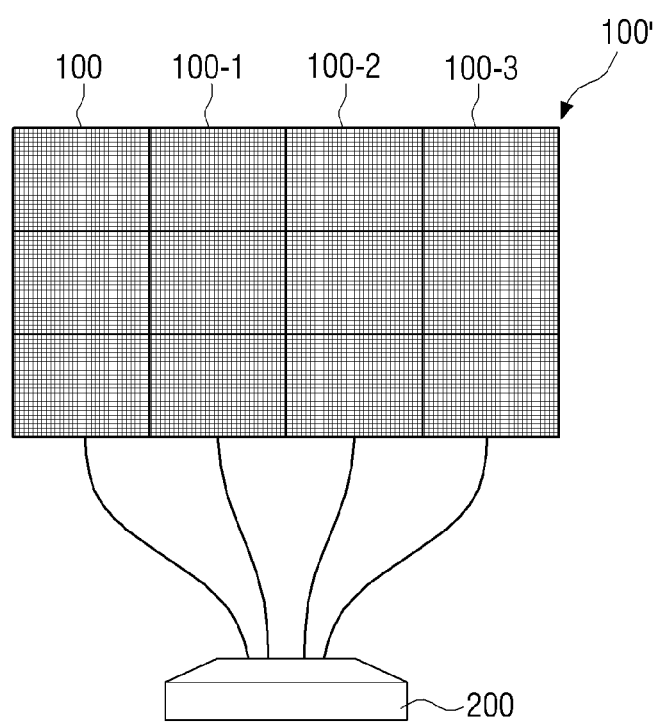
FIG. 3 is a diagram illustrating a display apparatus connected to an external apparatus according to an embodiment.

For example, as illustrated in FIG. 3, in case a plurality of display apparatuses 100, 100-1, 100-2, 100-3 are coupled in a 4×1 arrangement, the large-size display apparatus 100' may be connected to an external apparatus 200 through four connectors.

That is, the large-size display apparatus 100' may include a first connector connected to a first port of the external apparatus 200, a second connector connected to a second port of the external apparatus 200, a third connector connected to a third port of the external apparatus 200, and a fourth connector connected to a fourth port of the external apparatus 200.

The number of connectors as described above is merely an example and is not limited. The number of connectors may increase or decrease according to various embodiments.

The processor 160 controls the overall operations of the large-size display apparatus 100'. In addition, the processor 160 may also control the operations of each plurality of display apparatuses 100, 100-1, 100-2, 100-3, and so on. In addition, the processor 160 (e.g., at least one processor) may be included in each display apparatuses 100, 100-1, 100-2, 100-3, and so on. The processor 160 may include one or more of a central processing unit (CPU), an application processor (AP), or a communication processor (CP).

The processor 160 may receive image signals from the external apparatus 200. Specifically, the processor 160 may receive image signals from the external apparatus 200 through a plurality of connectors.

For example, as illustrated in FIG. 3, in case a plurality of display apparatuses 100, 100-1, 100-2, 100-3 are coupled in a 4×1 arrangement, the processor 160 may receive image signals from the external apparatus 200 through each connector included in each display apparatus.

Accordingly, when image signals are received, the processor 160 may identify the ports of the external apparatus 200 connected to the connector of each display apparatus.

That is, the processor 160 may identify the ports of the external apparatus 200 connected to each connector based on information on the ports of the external apparatus 200 included in image signals.

Figure 4:
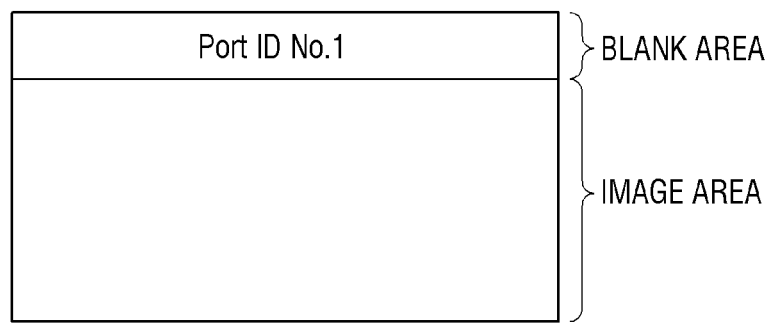
FIG. 4 is a diagram illustrating an image signal according to an embodiment.

Here, information on the ports of the external apparatus 200 may be included in blank areas of the image signals as shown in FIG. 4.

Referring to FIG. 4, an image signal received from the external apparatus 200 may include a blank area and an image area. Further, the blank area may store the port ID of the external apparatus 200.

For example, the image signal received from the first port of the external apparatus 200 may include information corresponding to port ID No. 1. As another example, the image signal received from the second port of the external apparatus 200 may include information corresponding to port ID No. 2.

Accordingly, the processor 160 may identify the ports of the external apparatus 200 connected to each connector through the port IDs included in the image signals.

The processor 160 may divide the plurality of display modules of the plurality of display apparatuses into a plurality of groups in a vertical direction based on the identified ports.

That is, each connector of the large-size display apparatus 100' may be provided on outermost display modules among the plurality of display modules.

For example, referring to FIG. 3, each connector of the large-size display apparatus 100 may be located in the lower parts of the plurality of display modules.

Accordingly, when it is identified that the first port of the external apparatus 200 is connected to the connector of the first display apparatus 100 included in the large-size display apparatus 100', the processor 160 may identify the display modules of the first display apparatus 100 as the first group. When it is identified that the second port of the external apparatus 200 is connected to the connector of the second display apparatus 100-1 included in the large-size display apparatus 100', the processor 160 may identify the display modules of the second display apparatus 100-1 as the second group. In a similar manner, the processor 160 may identify the display modules of the third display apparatus 100-2 included in the large-size display apparatus 100' as the third group, and identify the display modules of the fourth display apparatus 100-3 as the fourth group.

The processor 160 may then identify the location of each of the plurality of display modules based on the order of connection of the display modules included in each of the plurality of groups.

For this, the plurality of display modules included in each group may be serially connected in a vertical direction. That is, the plurality of display modules included in each group may be connected to one another in a daisy-chain manner.

For example, as illustrated in FIG. 3, each display module included in the first to fourth groups may be serially connected in a 1×3 arrangement. In this case, according to the order of connection of the plurality of display modules included in the first group, the processor 160 may identify that the display module located in the upper part is the display module located in the first position of the first group, the display module located in the center is the display module located in the second position of the first group, and the display module located in the lower part is the display module located in the third position of the first group. In a similar manner, the processor 160 may identify the locations of the plurality of display modules belonging to the second to fourth groups.

The processor 160 may then display images corresponding to the received image signals on each of the plurality of display modules based on the identified locations of the display modules.

Specifically, the processor 160 may crop image frames included in the received image signals based on the identified locations of the display modules, and display each of the cropped image frames on each of the plurality of display modules based on the identified locations of the display modules.

As described above, the display apparatus 100 according to an embodiment may identify the location of each display module automatically, as long as a plurality of display modules are serially connected in a vertical direction. Accordingly, the ports of the external apparatus 200 are connected to the connectors of the display apparatus 100.

Thus, a large-size display apparatus to which a plurality of display apparatuses are coupled, the large-size display apparatus 100' may easily process image signals.

Also, a user may recognize the identification ID of each display module by the exterior of the display apparatus 100. For example, the user may identify each display module based on which port of the external apparatus 200 is connected to the display apparatus 100, and based on the order of connection among the display modules. Accordingly, when it is necessary to correct a specific display module among a plurality of display modules, it is possible to select a specific display module easily and perform correction of the display module.

Figure 5:
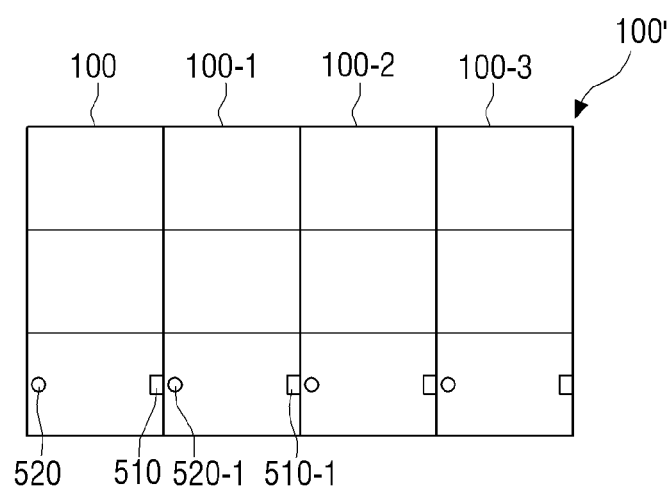
FIG. 5 is a diagram illustrating an example of identifying groups of a display apparatus according to an embodiment.

FIG. 5 is a diagram for illustrating an example of identifying groups of a display apparatus according to an embodiment.

As described above, the processor 160 may divide the display apparatus 100' into a plurality of groups based on the information on the ports of the external apparatus 200 included in the blank areas of image signals.

However, embodiments are not limited thereto, and the processor 160 may divide the display apparatus 100 into a plurality of groups through sensors provided on each of the plurality of display modules.

Here, the sensors may detect a display module on at least one side.

For example, referring to FIG. 5, each of the plurality of display modules may include an electro-magnet 510, which may be turned on and off. Each of the plurality of display modules may also include a sensor 520 that can detect electromagnetic waves.

First, the processor 160 may turn on the electro-magnets 510 and the sensors 520 included in the plurality of display modules.

Then, the processor 160 may identify a group including display modules to which a display module on at least one side is not detected among the plurality of display modules as the first group. For example, if the sensor 520 disposed in the display apparatus 100 does not detect any electromagnet to the left of the display module, the processor 160 may assign this display module to the first group.

Further, as illustrated in FIG. 5, in case the first to fourth display apparatuses 100, 100-1, 100-2, 100-3 are coupled from the left side to the right side, for example, the electro-magnets 510 are not disposed near the sensors 520 of the display modules of the first display apparatus 100 so that the sensors 520 are not significantly affected by magnetic fields generated by the electromagnets 510 included in the same display module.

As such, the processor 160 may identify the display modules of the first display apparatus 100 as the first group.

Further, in order to identify the second group, the processor 160 may turn off the sensors of the display modules included in the first group, and turn on the sensors of the display modules included in the remaining groups excluding the first group.

Then, the processor 160 may identify a group including display modules to which a display module on at least one side is not detected among the plurality of display modules as the second group located on the side surface of the first group.

For example, referring to FIG. 5, the processor 160 may turn off the electro-magnets 510 and the sensors 520 included in the first display apparatus 100 which is the identified first group, and turn on the electro-magnets and the sensors included in the remaining display apparatuses.

In this case, the sensors 520-1 of the second display apparatus 100-1 cannot detect a magnetic field as the electro-magnets 510 of the identified first group are turned off.

Accordingly, the processor 160 may identify the display modules of the second display apparatus 100-1 as the second group.

Then, the processor 160 may perform the aforementioned method repetitively, and identify a third group located on a side surface of the second group, and identify a fourth group located on a side surface of the third group in a sequential manner.

When each group is identified, the processor 160 may transmit signals requesting transmission of images corresponding to each group to the port of the external apparatus 200 connected to the connector of each group.

For example, in case the connector of the first group is connected to the fourth port of the external apparatus 200, the processor 160 may transmit a signal requesting transmission of an image corresponding to the first group to the fourth port of the external apparatus 200.

Similarly, the processor 160 may transmit signals requesting transmission of images corresponding to each group to each port of the external apparatus 200 connected to the connectors of the second to fourth groups.

Accordingly, the processor 160 may receive image signals corresponding to each group from the external apparatus 200.

Here, image signals corresponding to each group mean image frames of image signals that are divided based on the location and number of each group.

For example, as illustrated in FIG. 5, in case the four display apparatuses 100, 100-1, 100-2, 100-3 are coupled from the left side to the right side, and are implemented as a modular display apparatus 100', the divided image signals may be signals wherein image frames are quadrisectioned from the left side to the right side. Also, in case the size of each display apparatus 100, 100-1, 100-2, 100-3 is 1 m in width and 2 m in length, the divided image signals may be image frames of which width to length ratio is 1:2.

As described above, each group is divided by using sensors. Accordingly, in the large-size display apparatus 100' according to an embodiment, the first group may receive an image corresponding to the first group, even if the connector of the first group is not connected to the first port of the external apparatus 200.

This is because the processor 160 transmits a signal requesting transmission of an image signal corresponding to the first group to the port of the external apparatus 200 connected to the connector of the first group when the first group is identified, as described above.

Accordingly, a user may reproduce an image by connecting the connector of the first group to any port, without having to connect the connector of the first group to the first port of the external apparatus 200.

Figure 6:
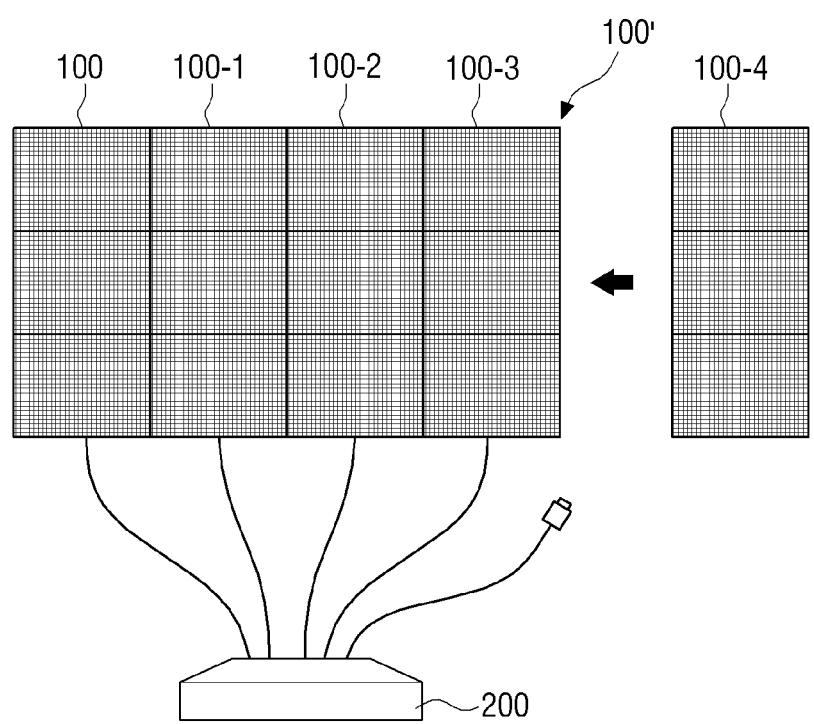
FIG. 6 is a diagram illustrating an example of new display modules being connected to a display apparatus in a horizontal direction according to an embodiment.

FIG. 6 is a diagram illustrating an example where new display modules are connected to a display apparatus according to an embodiment in a horizontal direction.

Referring to FIG. 6, at least one display module may be connected to the display apparatus 100 in a horizontal direction. Specifically, a new display apparatus 100-4 may be connected to the large-size display apparatus 100' through the coupling part of the large-size display apparatus 100'.

In this case, the processor 160 may identify the group of display modules of the newly connected display apparatus 100-4 based on the information on the ports of the external apparatus 200.

For example, when the connector of the display apparatus 100-4 is connected to the fifth port of the external apparatus 200, the display apparatus 100-4 may receive an image signal including information which is port ID No. 5 from the external apparatus 200, and the processor 160 may identify the group of the display modules the display apparatus 100-4 as the fifth group based on the information.

Then, the processor 160 may identify the locations of the display modules included in the identified group, based on the order of connection of at least one display module included in the identified group.

Further, the processor 160 may divide the image signal (or an image corresponding to the image signal) in consideration of the newly connected display apparatus 100-4. In the aforementioned example, the processor 160 may divide the image signal received from the external apparatus 200 in five equal parts.

Then, the processor 160 may transmit each of the divided image signals to each group.

As described above, in the display apparatus according to an embodiment, the locations of display modules coupled in a horizontal direction may be identified by connecting new display modules to the ports of the external apparatus 200. Thus, the display apparatus may be extended easily.

Figure 7:
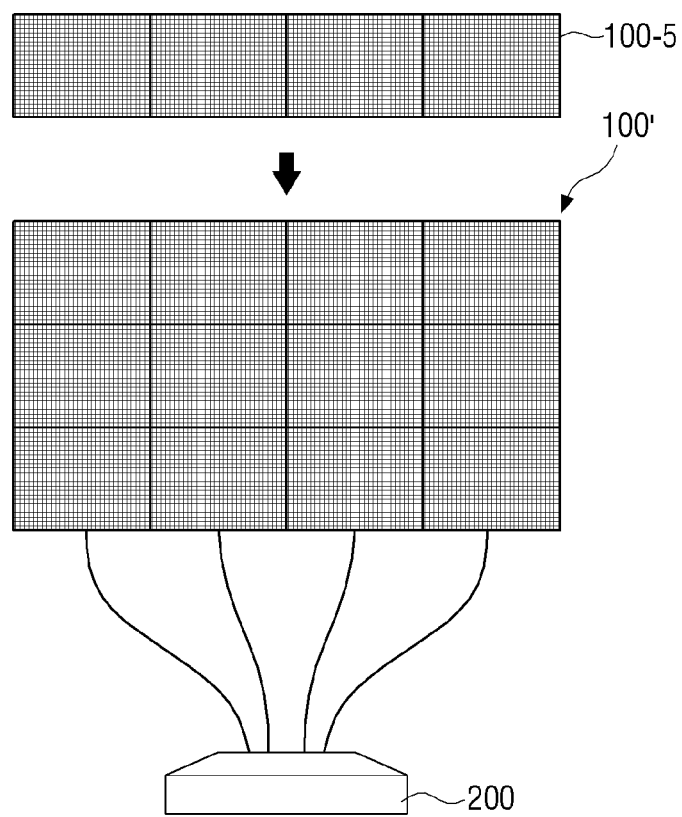
FIG. 7 is a diagram illustrating an example of new display modules being connected to a display apparatus in a vertical direction according to an embodiment.

FIG. 7 is a diagram for illustrating an example where new display modules are connected to a display apparatus in a vertical direction.

Referring to FIG. 7, at least one display apparatus 100-5 may be connected to the large-size display apparatus 100' in a vertical direction. Specifically, a new display apparatus 100-5 may be connected to the large-size display apparatus 100' through the coupling part of the large-size display apparatus 100'.

In this case, the processor 160 may identify the location of the display apparatus 100-5 based on the location of connection of the display apparatus 100-5. Specifically, the processor 160 may identify the location of the display apparatus 100-5 based on the order of connection of the display modules included in the identified group and the location of connection of the display apparatus 100-5.

For example, in case a new display module is connected to a display module located in the uppermost part among the display modules included in the first group, the processor 160 may identify that the new display module is located in the uppermost part of the first group based on the order of connection of the display modules included in the first group. Similarly, in case the new display module is connected to a display module located in the uppermost part among the display modules included in the second group, the processor 160 may identify that the new display module is located in the uppermost part of the second group based on the order of connection of the display modules included in the second group.

As described above, in the display apparatus according to an embodiment, the locations of display modules newly coupled in a vertical direction may be identified based on the order of connection of the display modules included in each group. Thus, the display apparatus may be extended easily.

According to an embodiment, the display apparatus may be extended simultaneously in a vertical direction and in a horizontal direction through the aforementioned method.

Figure 8:
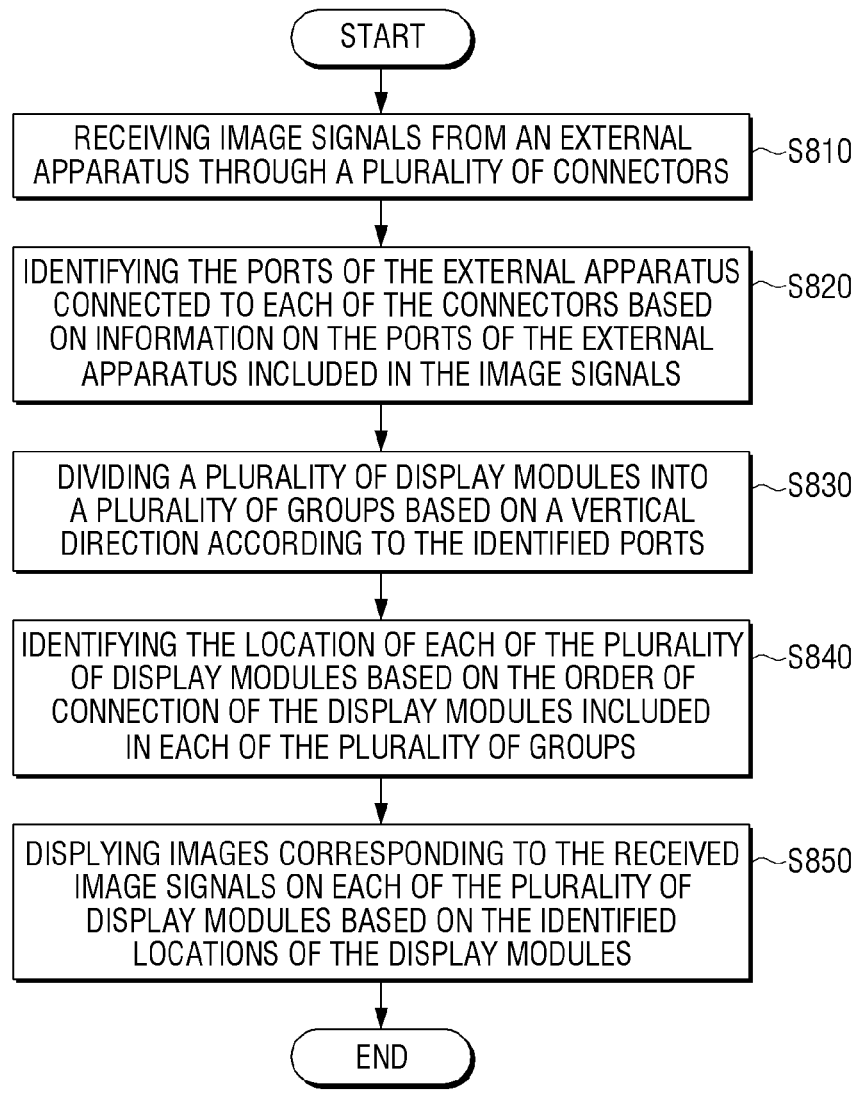
FIG. 8 is a flow chart illustrating an operation of a display apparatus according to an embodiment.

FIG. 8 is a flow chart illustrating an operation of a display apparatus according to an embodiment.

A modular display apparatus according to an embodiment may receive image signals from an external apparatus through a plurality of connectors (S810).

Here, the image signals may include information of the ports of the external apparatus. Specifically, information of the ports of the external apparatus may be included in blank areas of the image signals.

The modular display apparatus may identify the ports of the external apparatus connected to each connector based on the information of the ports of the external apparatus included in the image signals (S820).

Next, the modular display apparatus may divide the plurality of display modules into a plurality of groups based on a vertical direction according to the identified ports (S830).

Then, the modular display apparatus may identify the location of each of the plurality of display modules based on the order of connection of the display modules included in each of the plurality of groups (S840).

Further, the modular display apparatus may display images corresponding to the receive image signals on each of the plurality of display modules based on the identified locations of the display modules (S850).

In particular, the modular display apparatus may crop image frames included in the received image signals based on the identified locations of the display modules, and display each of the cropped image frames on each of the plurality of display modules based on the identified locations of the display modules.

According to an embodiment, a non-transitory computer-readable medium storing a program that executes the method for controlling an electronic apparatus in a sequential manner may be provided.

A non-transitory computer-readable medium refers to a medium that stores data semi-permanently, and is readable by machines. Specifically, the aforementioned various applications or programs may be executed while being stored in non-transitory computer-readable media such as a CD, a DVD, a hard disc, a blue-ray disc, a USB, a memory card, a ROM and the like.

While embodiments have been shown and described, the disclosure is not limited to the aforementioned specific embodiments, and it is apparent that various modifications can be made by those having ordinary skill in the art to which the disclosure belongs, without departing from the spirit and gist of the disclosure as claimed by the appended claims. Also, it is intended that such modifications are not to be interpreted independently from the technical idea or prospect of the disclosure.

What is claimed is:

1. A modular display apparatus comprising:
a plurality of display modules;
a plurality of connectors; and
a processor configured to:
    divide the plurality of display modules into a plurality of groups based on a vertical direction,
    based on an order of connection of at least one display module included in each of the plurality of groups, identify a location of each of the at least one display module included in each of the plurality of groups,
    based on the identified locations of the display modules, display, on each of the plurality of the display modules, images corresponding to image signals received from an external apparatus,
wherein each of the plurality of connectors is provided on one of the at least one display module included in each of the plurality of groups, and is connected to a respective port of a plurality of ports provided on the external apparatus,
wherein the processor is further configured to receive image signals corresponding to each of the plurality of groups from the external apparatus through each of the plurality of connectors, and based on information regarding the plurality of ports of the external apparatus included in the received image signals, identify the plurality of ports of the external apparatus respectively connected to the plurality of connectors, and divide the plurality of display modules into the plurality of groups based on the vertical direction according to the identified plurality of ports,
wherein each display module of the plurality of display modules comprises at least one sensor configured to detect another display module disposed on a side of the display module, and
wherein the processor is further configured to turn on the sensors of the plurality of display modules, and identify a first group including first display modules that do not detect another display module on a side of the first display modules.

2. The modular display apparatus of claim 1, wherein each of the plurality of connectors is provided on an outermost display module among display modules belonging to each of the plurality of groups.

3. The modular display apparatus of claim 1, wherein the information regarding the plurality of ports of the external apparatus is included in blank areas of the image signals.

4. The modular display apparatus of claim 1, wherein display modules included in each of the plurality of groups are serially connected in the vertical direction.

5. The modular display apparatus of claim 1, wherein the processor is further configured to:
    turn off sensors of the first display modules included in the first group, and turn on sensors of display modules included in remaining groups excluding the first group, and
    after the sensors of the first display modules included in the first group are turned off, identify a second group including second display modules that do not detect another display module on a side of the second display modules.

6. The modular display apparatus of claim 5, wherein the processor is further configured to transmit a signal requesting transmission of an image corresponding to the first group to a port of the external apparatus that is connected to a connector of the first group.

7. The modular display apparatus of claim 1, wherein the processor is further configured to:
    based on at least one new display module being connected to one of the plurality of groups in a horizontal direction, identify a group of the least one new display module based on information regarding the plurality of ports of the external apparatus, and
    based on an order of connection of display modules included in the identified group, identify locations of the display modules included in the identified group.

8. The modular display apparatus of claim 1, wherein the processor is further configured to, based on at least one new display module being connected to one of the plurality of groups in the vertical direction, identify locations of the at least one new display module based on an order of connection of display modules included in the identified group and locations of connection of the at least one new display module.

9. A method for controlling a modular display apparatus, the method comprising:
    dividing a plurality of display modules into a plurality of groups based on a vertical direction;
    based on an order of connection of at least one display module included in each of the plurality of groups, identifying a location of each of the at least one display module included in each of the plurality of groups; and
    based on the identified locations of the display modules, displaying images corresponding to image signals received from an external apparatus on each of the plurality of display modules,
    wherein a connector of a plurality of connectors of the modular display apparatus is provided on one of the at least one display module included in each of the plurality of groups, and is connected to a port of a plurality of ports provided on the external apparatus, and
    wherein the dividing the plurality of display modules into the plurality of groups comprises:
    receiving image signals corresponding to each of the plurality of groups from the external apparatus through each of the plurality of connectors, and
    based on information regarding the plurality of ports of the external apparatus included in the received image signals, identifying the plurality of ports of the external apparatus connected to the plurality of the connectors, and dividing the plurality of display modules into the plurality of groups based on the vertical direction according to the identified plurality of ports,
    wherein each display module of the plurality of display modules comprises at least one sensor configured to detect another display module disposed on a side of the display module, and
    wherein the dividing the plurality of display modules into the plurality of groups further comprises turning on the sensors of the plurality of display modules, and identifying a first group including first display modules that do not detect another display module on a side of the first display modules.

10. The method of claim 9, wherein each of the plurality of connectors is provided on an outermost display module among display modules belonging to each of the plurality of groups.

11. The method of claim 9, wherein the information regarding the plurality of ports of the external apparatus is included in blank areas of the image signals.

12. The method of claim 9, wherein display modules included in each of the plurality of groups are serially connected in the vertical direction.

13. The method of claim 9, wherein the dividing the plurality of display modules into the plurality of groups further comprises:
    turning off sensors of the first display modules included in the first group, and turning on sensors of display modules included in remaining groups excluding the first group; and
    after the sensors of the first display modules included in the first group are turned off, identifying a second group including second display modules that do not detect another display module on a side of the second display modules.

14. The method of claim 13, further comprising:
    transmitting a signal requesting transmission of an image corresponding to the first group to a port of the external apparatus that is connected to a connector of the first group.

15. The method of claim 9, further comprising:
    based on at least one new display module being connected to one of the plurality of groups in a horizontal direction, identifying a group of the at least one new display module based on information regarding the plurality of ports of the external apparatus; and
    based on an order of connection of display modules included in the identified group, identifying locations of the display modules included in the identified group.

16. The method of claim 9, further comprising:
    based on at least one new display module being connected to one of the plurality of groups in the vertical direction, identifying locations of the at least one new display module based on an order of connection of display modules included in the identified group and locations of connection of the at least one new display module.

* * * * *